United States Patent
Wüllrich et al.

(10) Patent No.: US 6,821,640 B2
(45) Date of Patent: Nov. 23, 2004

(54) BENT EXTRUDED PROFILE

(75) Inventors: Heinz Wüllrich, Bogen (DE); Franz Haberl, Wallerfing (DE); Michael Rauscher, Deggendorf (DE)

(73) Assignee: Edscha Cabrio-Dachsysteme GmbH, Hengersberg (DE)

( * ) Notice: Subject to any disclaimer, the term of this patent is extended or adjusted under 35 U.S.C. 154(b) by 0 days.

(21) Appl. No.: 10/386,852

(22) Filed: Mar. 12, 2003

(65) Prior Publication Data

US 2003/0175542 A1 Sep. 18, 2003

(30) Foreign Application Priority Data

Mar. 13, 2002 (DE) .......................................... 102 10 968

(51) Int. Cl.[7] .............................. F16S 3/02; B21D 39/00
(52) U.S. Cl. ...................... 428/595; 428/582; 428/586; 428/598; 29/505; 29/521; 52/731.3
(58) Field of Search ................................. 428/598, 586, 428/582, 595; 29/505, 521; 52/731.3

(56) References Cited

U.S. PATENT DOCUMENTS

| | | | |
|---|---|---|---|
| 3,636,339 A | * | 1/1972 | Osborne, Jr. ................. 362/362 |
| 2003/0019184 A1 | * | 1/2003 | Habicht ...................... 52/730.6 |
| 2003/0098628 A1 | * | 5/2003 | Enomoto et al. ............ 310/218 |

FOREIGN PATENT DOCUMENTS

| DE | 19622759 | 6/1997 |
|---|---|---|
| DE | 10015986 | 10/2001 |

* cited by examiner

*Primary Examiner*—John J. Zimmerman
(74) *Attorney, Agent, or Firm*—Davidson, Davidson & Kappel, LLC

(57) ABSTRACT

A method for producing a bent extruded profile that includes extruding a first profile bar having a first lateral formation, extruding a second profile bar having a second lateral formation corresponding in a form-fitting manner to the first lateral formation, and inserting the first lateral formation into the second lateral formation so as to connect the first and second profile bars and to create a form-fitting connection restricting relative movement between the first and second profile bars in all directions except a longitudinal direction of the profile bars. The method also includes bending the connected first and second profile bars using a bending process, wherein after bending, the form-fitting connection restricts relative movement between the first and second profile bars in all directions. In addition, an extruded profile including a first profile bar having a first formation on a first longitudinal side and a second profile bar having a second formation on a second longitudinal side. The second profile bar is secured to the first profile bar in a form-fitting connection at the first and second formations with at least one passing gap disposed in a region of the first and second formations. The first and second profile bars are bendable via a bending process to a bent state. The form-fitting connection allows a relative movement between the first and second profile bars in the longitudinal direction prior to bending.

16 Claims, 1 Drawing Sheet

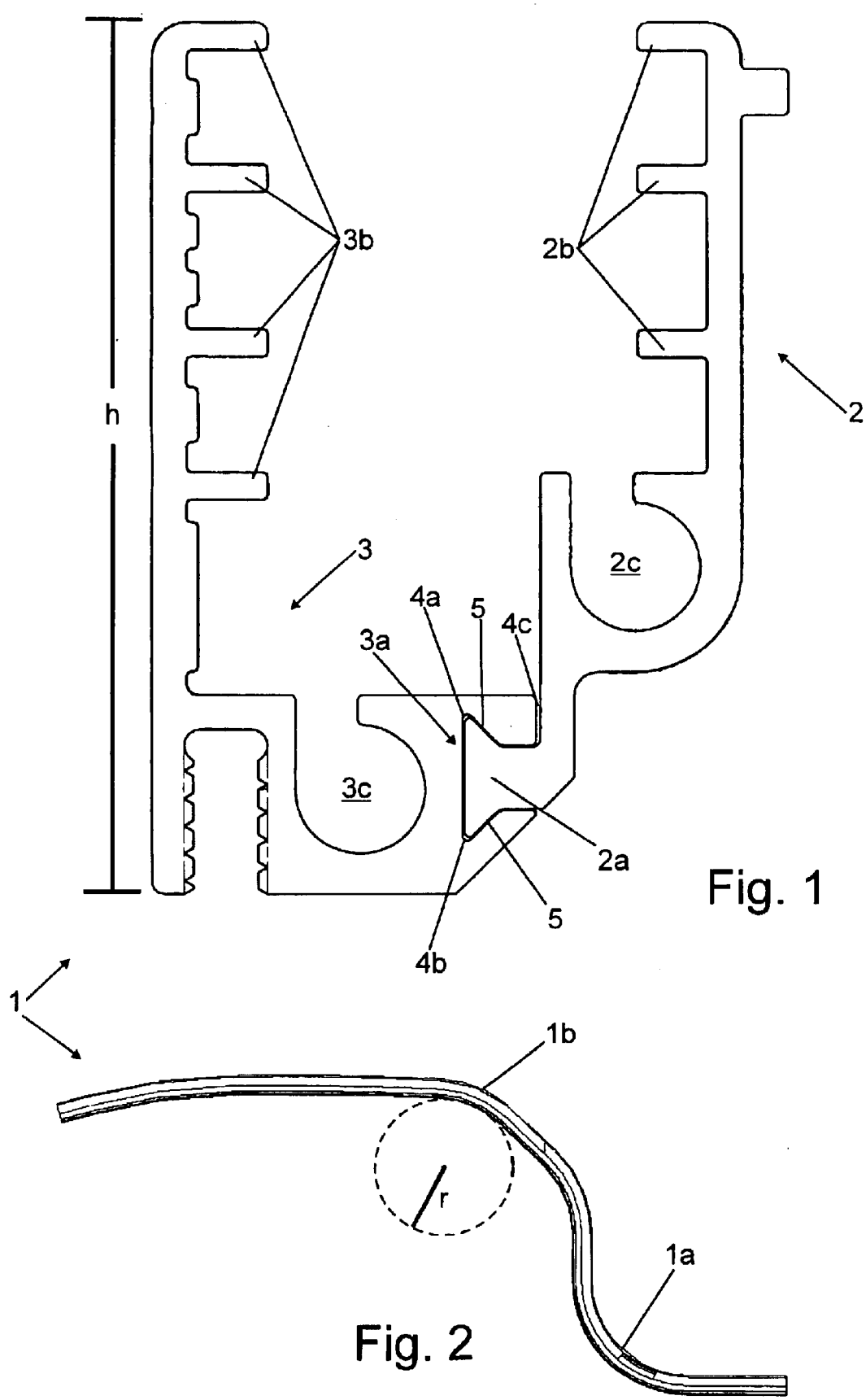

BENT EXTRUDED PROFILE

Priority is claimed to German Patent Application No. 102 10 968.0-24, filed Mar. 13, 2002.

BACKGROUND INFORMATION

The invention relates to a bent extruded profile, in particular a running rail for movable tops of motor vehicles, comprising a first profile bar and at least one second profile bar which is secured in a form-fitting manner on the longitudinal side of the first profile bar, the securing being brought about by means of formations which substantially correspond to each other and extend on longitudinal sides of the profile bars.

Metal profiles, in particular made of light metal, such as aluminum, can be produced in virtually any desired cross-sectional shape by means of extrusion or related shaping processes. In the motor vehicle sector, in particular, extruded profiles of this type have diverse uses, particularly within the context of "space-frame technology" which has recently appeared. An area of use for extruded profiles of this type that has likewise appeared recently is the region of movable tops of motor vehicles, in which extruded profiles of this type are used, in particular, as running rails for folding or sliding roofs which can be moved over large regions of the vehicle interior.

Profiles are frequently required which, firstly, have a complex cross section with functionally important structures, some of which are filigree, and, secondly, have to be bent in the longitudinal direction. However, particularly in the case of profiles having a complex cross section and small bending radii in relation to the profile diameter problems occur, in particular when using aluminum as the profile material.

German Patent Document No. DE 196 22 759 A1 describes metal profiles, which can be assembled essentially in accordance with the tongue-and-groove principle in order thus to be able to produce complex profile shapes, in particular when using steel as the profile material. In this case, the proposed tongue-and-groove connections effect a frictional connection between the sub-profiles in all spatial directions from the outset. In a subsequent bending of the profiles, this does not give rise to any differences from a single profile manufactured from a solid material.

German Patent Document No. DE 100 15 986 A1 describes a composite profile in which a first profile consisting of metal has lateral grooved sockets, and a second profile consisting of plastic uses corresponding formations to engage in the grooved sockets. The grooved sockets of the first profile are dimensioned in such a manner that a gap generally remains even after engagement of the second profile, the dimensioning serving to compensate for dimensional tolerances of the profiles in the region of their mutual engagement. The profiles can be secured to one another in a form-fitting manner in all of the directions perpendicular with respect to the longitudinal direction by webs of the grooved sockets of the first profile being plastically molded after engagement of the profiles, with, preferably, resilient longitudinal means also being placed between the profiles in the region of the grooved socket. The direction of deformation here is exclusively perpendicular with respect to the longitudinal extent, so that the profiles which are as a result connected to one another are secured on one another in a form-fitting manner in transverse directions, but merely non-positively or frictionally in the longitudinal direction. Bending of the profiles about an axis perpendicular with respect to the longitudinal extent is not envisaged, with the result that compressions and distortions of the material in the longitudinal direction of the profile do not occur.

SUMMARY OF THE INVENTION

It is an object of the invention to specify a bent extruded profile and a method for producing a bent extruded profile, in which particularly small bending radii can be produced with respect to bending the profile using bending techniques known per se.

The present invention provides a bent extruded profile, in particular a running rail for movable tops of motor vehicles, that includes a first profile bar, at least one second profile bar which is secured in a form-fitting manner on the longitudinal side of the first profile bar, the securing being brought about by means of formations which substantially correspond to each other and extend on longitudinal sides of the profile bars, and at least one passing gap being provided in the region of the corresponding formations, wherein, prior to being bent, it is possible for the profile bars, which are secured to each other, to be moved relative to each other in the longitudinal direction, and wherein a completely form-fitting connection of the profile bars to each other is achieved after bending of the profile bars.

According to the invention, the two profile bars here are secured on each other in a form-fitting manner in their longitudinal direction such that they can be moved relative to each other prior to being bent in the longitudinal direction, the provision of the passing gap in the region of the corresponding formations enabling the material which is compressed during bending to be deflected, the passing of the compressed material into the passing gap preventing, in particular in the region of small bending radii, the profile material from tearing or preventing the profile material from being deformed perpendicular with respect to its longitudinal direction. A bent extruded profile according to the invention also comprises designs in which more than two profile bars are secured on each other.

In a preferred embodiment of a bent extruded profile according to the invention, the corresponding formations have an essentially dovetailed or swallowtailed cross section, with a first and a second passing gap being provided in each case in the region of corners of the dovetailed or swallowtailed cross section and a further passing gap being provided in the region of a projection of the dovetailed or swallowtailed cross section. This provision of a plurality of passing gaps and the dovetailed shaping permit the extruded profile to be bent in different directions, with different passing gaps in each case receiving the material bulges when bending it in different directions.

A bent extruded profile according to the invention preferably has a cross-sectional shape essentially in the form of a U, as a result of which the bent extruded profile is especially suitable for use as a running rail for movable tops of motor vehicles.

The bent extruded profile particularly preferably consists of aluminum, since this material, in particular, is generally increasingly being used in the construction of motor vehicles, although limits are imposed with regard to its bending capability. As an alternative to this, a bent extruded profile according to the invention may, however, also consist of magnesium or steel or of another metal, since the improvement, which is associated with the present invention, in bending radii which can be achieved applies, in principle, for all of the materials from which bent extruded profiles can be produced. In particular, the second profile bar may also consist of a different material than the first profile bar.

The extruded profile according to the invention particularly preferably has, at least in some regions, a bending radius, which is less than four times the profile diameter present in the bending direction. By achieving ratios of this type between the profile height or diameter and the bending radius, particularly great flexibility in the shaping of structural parts produced firstly via an extrusion process can be achieved.

A method for producing a bent extruded profile according to the invention comprises the following steps:

1. Production of a first profile bar and at least one second profile bar according to an extrusion process known per se, the first profile bar having a lateral formation and the second profile bar having a formation which corresponds in a form-fitting manner to the lateral formation of the first profile bar;
2. Connecting the at least two profile bars in a form-fitting manner by inserting the lateral formation of the first profile bar into the lateral formation of the second profile bar, as a result of which a form-fitting connection is achieved in all directions except for the longitudinal direction of the profile bars;
3. Bending of the connected profile bars by means of a bending process known per se, wherein, after bending, a completely form-fitting connection of the profile bars to each other is achieved.

By this means, a bent extruded profile is produced in a simple manner without additional tools or machines in comparison with conventional processes having to be used.

In a preferred method according to the invention, the lateral formations of the profile bars produced by method step 1 are preferably designed in such a manner that after the form-fitting connection according to method step 2, a passing gap remains between the two lateral formations. This permits a further improvement in the bending radii which can be achieved during bending in accordance with method step 3, since the material being compressed during the bending process can pass into the passing gap before excessive distortion of the material and tears or cracks can occur. Further features and advantages of the invention emerge from the exemplary embodiment described below and from the claims.

BRIEF DESCRIPTION OF THE DRAWINGS

A preferred exemplary embodiment of a bent extruded profile will be described below and explained in greater detail with reference to the attached drawings, in which:

FIG. 1 shows a cross section through an extruded profile according to the invention, in which the passing gaps at the point of the drawing of the cross section have not been filled by deformed material; and FIG. 2 shows a lateral view of the bent extruded profile from FIG. 1.

DETAILED DESCRIPTION OF A PREFERRED EMBODIMENT

The bent extruded profile shown in FIG. 1 comprises a first profile bar 2 and a second profile bar 3. The two profile bars 2, 3 are secured on each other by means of formations 2a, 3a, which substantially correspond to each other and extend on the longitudinal side. In this case, the one formation 2a is formed on the first profile bar 2 and has an essentially dovetailed cross section. The formation 3a, which corresponds thereto, of the second profile bar 3 is accordingly an essentially dovetailed recess, the recess being open in the region of the projection of the dovetail, with the result that the dovetailed formation 2a of the first profile bar 2 can be inserted into the hollow recess 3a of the second profile bar 3. The recess 3a of the second profile bar 3 is not precisely of inverse design with respect to the formation 2a, but has a passing gap 4a and 4b in each case in the regions of the corners of the dovetailed cross section. A further passing gap 4c is situated in the region of the projection or neck of the dovetail, this passing gap 4c being especially suitable for receiving compressed material in the direction of the axis of symmetry of the dovetailed cross section. The passing gaps 4a, 4b defined in the corners of the dovetailed cross section serve especially for receiving compressed material in a direction perpendicular with respect to the axis of symmetry of the dovetailed cross section. Overall, this permits the possibility of compressed material being deflected during bending of the bent extruded profile 1 in any desired spatial directions.

Overall, the bent extruded profile 1 has a cross section essentially in the form of a U, the two limbs of the U each being formed by one of the two profile bars 2, 3. In the region of the base of the U, the two profile bars 2, 3 being secured on each other by means of the prescribed securing by form-fitting means. The individual profile bars 2, 3 have further formations which are matched to the function of the bent extruded profile, for example pins 2b, 3b which protrude perpendicular with respect to the limbs of the U into the interior space of the U and by means of which supporting surfaces for rolling bodies which can be inserted are formed. This enables the bent extruded profile 1 to be used as a running rail for movable tops of motor vehicles. Further formations provided on the profile bars 2, 3 are half-open, cross-sectionally essentially circular recesses 2c, 3c which serve for receiving and guiding driving cables for driving the rolling bodies or the movable top. It can be seen that, in particular with regard to the use of the bent extruded profile as a running rail for movable tops, exacting requirements have to be placed on the alignment of the pins 2b, 3b with respect to each other and on the circular form of the half-open recesses 2c, 3c.

FIG. 2 shows the bent extruded profile from FIG. 1 in a lateral view, in which the bending necessary in order to adapt the extruded profile 1 to the profile of the body shape of the motor vehicle becomes obvious. In this case, particularly narrow bending radii occur, inter alia, in regions 1a, 1b. In addition, the extruded profile 1 is bent not only in the plane according to FIG. 2, but also in the plane perpendicular thereto (not illustrated). If the bent extruded profile 1 were configured as an integral extruded profile consisting only of a single profile bar, deformation of the cross section of the extruded profile would occur at least in the regions 1a, 1b having small bending radii, as a result of which, for example, the limbs of the U would no longer run parallel to each other, which would impair the strict requirements regarding the precision of a running rail for movable tops. In addition, during the bending process tearing of the material may occur, depending on the bending radius required, in particular if the bent extruded profile consists of aluminum, as in the exemplary embodiment shown.

However, in the exemplary embodiment shown, which corresponds to the present invention, two profile bars 2, 3 are secured in a form-fitting manner on each other. During the production of the bent extruded profile 1, the two profile bars 2, 3 are first of all provided as straight longitudinal bodies. These two straight longitudinal bodies 2, 3 are then pushed together with the aid of the formations 2a, 3a, which are formed on them, substantially correspond to each other and extend on the longitudinal side, in which case, firstly, the two profile bars 2, 3 are connected to each other in a play-free manner, but, secondly, the prescribed passing gaps 4a, 4b, 4c remain. In this pushed-together state, common bending of the two profile bars 2, 3 can now be carried out, it being possible for the material compressions, which occur in particular in the region of small bending radii 1a, 1b, to be deflected into the passing gaps 4a, 4b, 4c which are present. In addition, the material of the one profile bar can be mutually displaced with respect to the material of the other profile bar in each case along supporting surfaces 5 in the region of the dovetailed cross section, with the result that most of the material stresses which occur in the case of an integral profile are thereby avoided. This permits the production of particularly small bending radii. In particular, it is possible in the exemplary embodiment shown here to provide the bent extruded profile 1 with bending radii which are not more than four times the profile height present in the bending direction. With regard to the attached figures, this would mean that the limb height h of the U-shaped cross section, which is the diameter of the profile in the direction of bending, can be more than a quarter of the bending radius r of the region 1b (see FIG. 2).

What is claimed is:

1. An extended profile, comprising:
   a first profile bar having a first formation on a first longitudinal side;
   a second profile bar having a second formation on a second longitudinal side, the second profile bar secured to the first profile bar in a form-fitting connection at the first and second formations; and
   at least one passing gap disposed in a region of the first and second formations, wherein the first and second profile bars are bendable via a bending process to a bent state, and wherein the form-fitting connection allows a relative movement between the first and second profile bars in the longitudinal direction prior to bending,
   wherein the passing gap serves to receive compressed material of the profiles in the bent state, and
   wherein a completely form-fitting connection of the profile bars to each other is achieved after bending.

2. The extruded profile as recited in claim 1, wherein a bending radius of the profiles which can be achieved is improved by passing of the compressed material into the passing gap during the bending process.

3. The extruded profile as recited in claim 1, wherein the first and second profiles form a running rail for a movable top of a motor vehicle in the bent state.

4. The extruded profile as recited in claim 1, wherein each of the first and second formations have a dovetailed cross section.

5. The extruded profile as recited in claim 4, wherein the at least one passing gap includes a first and a second passing gap disposed at corner regions of the dovetailed cross sections and a further passing gap disposed in a neck region of the dovetailed cross sections.

6. The extruded profile as recited in claim 1, wherein the first and second formations have a U-shaped cross-section.

7. The bent extruded profile as recited in claim 1, wherein at least one of the first and second profile bars includes aluminum.

8. The extruded profile as recited in claim 1, wherein at least one of the first and second profile bars includes magnesium.

9. The extruded profile as recited in claim 1, wherein at least one of the first and second profile bars includes steel.

10. The extruded profile as recited in claim 1, wherein the second profile bar includes a different material than the first profile bar.

11. The extruded profile as recited in claim 1, wherein in the bent state, the first profile bar includes a bending radius less than four times a height of the first profile bar in the bending direction.

12. A method for producing a bent extruded profile, the method comprising:
    extruding a first profile bar having a first lateral formation;
    extruding a second profile bar having a second lateral formation corresponding in a form-fitting manner to the first lateral formation;
    inserting the first lateral formation into the second lateral formation so as to connect the first and second profile bars and to create a form-fitting connection restricting relative movement between the first and second profile bars in all directions except a longitudinal direction of the profile bars; and
    bending the connected first and second profile bars using a bending process, wherein after bending, a completely form-fitting connection restricts relative movement between the first and second profile bars in all directions.

13. The method as recited in claim 12, wherein the form-fitting connection includes a passing gap between the first and second lateral formations before bending.

14. An extruded profile, comprising:
    a first profile bar having a first formation on a first longitudinal side;
    a second profile bar having a second formation on a second longitudinal side, the second profile bar secured to the first profile bar in a form-fitting connection at the first and second formations, the first and second formations having a U-shaped cross-section; and
    at least one passing gap disposed in a region of the first and second formations, wherein the first and second profile bars are bendable via a bending process to a bent state, and wherein the form-fitting connection allows a relative movement between the first and second profile bars in the longitudinal direction prior to bending.

15. An extruded profile, comprising:
    a first profile bar having a first formation on a first longitudinal side;
    a second profile bar having a second formation on a second longitudinal side, the second profile bar secured to the first profile bar in a form-fitting connection at the first and second formations; and
    at least one passing gap disposed in a region of the first and second formations, wherein the first and second profile bars are bendable via a bending process to a bent state, wherein the form-fitting connection allows a relative movement between the first and second profile bars in the longitudinal direction prior to bending, and wherein, the bent state, the first profile bar includes a bending radius less than four times a height of the first profile bar in the bending direction.

16. A method for producing a bent extruded profile, the method comprising:
    extruding a first profile bar having a first lateral formation;
    extruding a second profile bar having a second lateral formation corresponding in a form-fitting manner to the first lateral formation;
    inserting the first lateral formation into the second lateral formation so as to connect the first and second profile bars and to create a form-fitting connection restricting relative movement between the first and second profile bars in all directions except a longitudinal direction of the profile bars, the form-fitting connection including a passing gap between the first and second lateral formations; and bending the connected first and second profile bars using a bending process, wherein, after bending, the form-fitting connection restricts relative movement between the first and second profile bars in all directions.

* * * * *